United States Patent
Beach et al.

(10) Patent No.: US 7,381,753 B2
(45) Date of Patent: *Jun. 3, 2008

(54) INKJET INK COMPOSITION

(75) Inventors: Bradley Leonard Beach, Lexington, KY (US); Alberto Carrillo, Johnson City, TN (US); Michael Paul Hallden-Abberton, Maple Glen, PA (US); Ann P. Holloway, Lexington, KY (US); Joseph Edward Johnson, Lexington, KY (US); George Max Lein, Chalfont, PA (US); Richard Foster Merritt, Fort Washington, PA (US); Anna Marie Pearson, Richmond, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/106,156

(22) Filed: Apr. 14, 2005

(65) Prior Publication Data

US 2005/0288391 A1 Dec. 29, 2005

Related U.S. Application Data

(60) Provisional application No. 60/583,679, filed on Jun. 29, 2004.

(51) Int. Cl.
*C09D 11/00* (2006.01)
*C08L 33/02* (2006.01)
*C08L 33/08* (2006.01)
*C08L 33/10* (2006.01)
*C08L 1/00* (2006.01)
*C08F 2/20* (2006.01)

(52) U.S. Cl. ............... 523/106; 523/161; 524/800; 524/827; 524/831; 524/804; 106/31.13; 106/31.27; 106/31.28; 106/31.6; 106/31.33; 106/31.43; 106/31.57

(58) Field of Classification Search ........... 523/160, 523/161; 524/800, 827, 831; 106/31.13, 106/31.27, 31.28, 31.33, 31.43, 31.57, 31.6
See application file for complete search history.

(56) References Cited

U.S. PATENT DOCUMENTS

| | | | |
|---|---|---|---|
| 5,134,187 A * | 7/1992 | Aihara | 524/548 |
| 5,712,338 A | 1/1998 | Donovan et al. | |
| 5,853,861 A | 12/1998 | Held | |
| 5,874,974 A * | 2/1999 | Courian et al. | 347/65 |
| 6,031,019 A * | 2/2000 | Tsutsumi et al. | 523/160 |
| 6,281,267 B2 * | 8/2001 | Parazak | 523/160 |
| 6,417,249 B1 * | 7/2002 | Nguyen et al. | 523/201 |
| 6,646,024 B2 | 11/2003 | Beach et al. | |
| 6,716,912 B2 | 4/2004 | Freeman et al. | |
| 6,863,719 B2 * | 3/2005 | Butler et al. | 106/31.28 |
| 7,074,842 B2 * | 7/2006 | Chung et al. | 523/160 |
| 2003/0166742 A1 * | 9/2003 | Hirasa et al. | 523/160 |
| 2003/0176532 A1 | 9/2003 | Chung et al. | |
| 2004/0087716 A1 * | 5/2004 | Ganapathiappan | 524/800 |
| 2005/0272831 A1 * | 12/2005 | Wang et al. | 523/160 |

FOREIGN PATENT DOCUMENTS

JP HEI 10-120952 5/1998

* cited by examiner

*Primary Examiner*—Sanza L. McClendon
(74) *Attorney, Agent, or Firm*—Dinsmore & Shohl, LLP

(57) ABSTRACT

An inkjet ink composition having a binder including an aqueous dispersion of polymer particles, the polymer including, as polymerized units, (a) from 0 to 1 wt. % monoethylenically unsaturated acid monomer, based on polymer weight; and (b) monomer of the formula

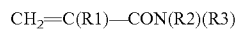

$CH_2$=C(R1)—CON(R2)(R3)

wherein R1=H, $CH_3$ or $C_2H_5$ and R2 and R3 are independently selected from C1-C6 saturated alkyl and cycloalkyl groups; and wherein the total of (a) and (b) is at least 0.1 wt % monomer based on the polymer weight. The binder may be a copolymer of ethyl acrylate and acrylamide. An inkjet ink composition including the inkjet ink binder, a colorant, and a liquid medium is also provided.

5 Claims, No Drawings

INKJET INK COMPOSITION

This application claims the benefit of U.S. Provisional Application No. 60/583,679, filed, Jun. 29, 2004. The present invention was a result of activities undertaken within the scope of a joint research agreement between Lexmark International, Inc. and The Rohm and Haas Company.

This invention relates to a binder composition for inkjet inks and inkjet inks including the binder. In particular, this invention relates to an inkjet ink binder including an aqueous dispersion of polymer particles, the polymer including, as polymerized units, (a) from 0 to 1 wt. % monoethylenically unsaturated acid monomer, based on polymer weight; and (b) monomer of the formula $$CH_2\!=\!C(R1)\!-\!CON(R2)(R3)$$

wherein R1=H, $CH_3$ or $C_2H_5$ and R2 and R3 are independently selected from C1-C6 saturated alkyl and cycloalkyl groups; and wherein the total of (a) and (b) is at least 0.1 wt % monomer based on the polymer weight. In addition the invention relates to an inkjet ink composition including the inkjet ink binder, a colorant, and a liquid medium.

In particular, this invention relates to inkjet inks having binder resins to fix pigments in the ink on the paper or other substrate on which the ink is applied. Such inkjet inks may be applied by standard thermal drop-on-demand printing.

U.S. Pat. No. 6,646,024 B2 discloses a polymeric binder useful for water-resistant inkjet inks wherein the binder contains an acid component in the range from about 1 to about 10 wt % of the polymer, a Tg in the range from about −20° C. to about 25° C., and an average particle diameter in the range from about 250 to about 400 nm, and a particle size distribution such that essentially all the particles have a diameter in the range from 130 to 450 nm. Wet-rub smear of prints formed from these inks or resistance to smearing by highlighter pens was much improved over example inks not containing binder. The binder of this invention showed good printing reliability in the presence of polymer-dispersed pigments, but did not show good printing reliability when used with a self-dispersed pigment. Improvements in printing reliability in the presence of either polymer-dispersed and/or self dispersed pigments and improved resistance to smearing by highlighter pens are still desired.

U.S. patent application Ser. No. 20030176532 A1 discloses a polymeric binder useful for water-resistant inkjet inks wherein the binder contains methylol (meth)acrylamide or substituted methylol (meth)acrylamides. These moieties are reactive, and may form covalent bonds at room temperature liberating by-products such as formaldehyde (more rapidly with heat and with catalysts) to form crosslinked polymer.

It is therefore desirable to obtain an inkjet ink binder which, when incorporated into an inkjet ink, simultaneously provides printing reliability along with wet-rub smear resistance and resistance to smearing by highlighter pens in a variety of ink formulations without the evolution of by-products. The inkjet binder of the present invention, when incorporated into inkjet inks, provides such performance.

According to a first aspect of the present invention there is provided an inkjet ink binder comprising an aqueous dispersion of polymer particles, said polymer comprising, as polymerized units, (a) from 0 to 1 wt. % monoethylenically unsaturated acid monomer, based on polymer weight; and (b) monomer of the formula $$CH_2\!=\!C(R1)\!-\!CON(R2)(R3)$$

wherein R1=H, $CH_3$ or $C_2H_5$ and R2 and R3 are independently selected from H and C1-C6 saturated alkyl and cycloalkyl groups; and wherein the total of (a) and (b) must be at least 0.1 wt % based on said polymer weight.

According to a second aspect of the present invention there is provided an inkjet ink composition comprising the inkjet ink binder of the first aspect of the present invention, a colorant and a liquid medium.

The present invention relates to an inkjet ink binder including an aqueous dispersion of polymer particles, the polymer including, as polymerized units, (a) from 0 to 1 wt. % monoethylenically unsaturated acid monomer, based on polymer weight; and (b) monomer of the formula $$CH_2\!=\!C(R1)\!-\!CON(R2)(R3)$$

wherein R1=H, $CH_3$ or $C_2H_5$ and R2 and R3 are independently selected from H and C1-C6 saturated alkyl and cycloalkyl groups; and wherein the total of (a) and (b) must be at least 0.1 wt % based on said polymer weight.

Suitable acid monomers include, for example, acrylic acid, methacrylic acid, crotonic acid, itaconic acid, fumaric acid, maleic acid, monomethyl itaconate, monomethyl fumarate, monobutyl fumarate, sodium vinylsulfonic acid, and acrylamidopropane sulfonic acid. Precursor monomers which form acid monomers before, during, or after polymerization such as maleic anhydride and sodium vinylsulfonates are also included. Preferred acid monomers are carboxylic acid monomers such as methacrylic acid, acrylic acid, and combinations thereof.

Suitable monomers of the formula $$CH_2\!=\!C(R1)\!-\!CON(R2)(R3)$$

wherein R1=H, $CH_3$ or $C_2H_5$ and R2 and R3 are independently selected from H and C1-C6 saturated alkyl and cycloalkyl groups include (meth)acrylamide, ethacrylamide, N-methyl acrylamide, N-ethyl methacrylamide, N-t-butyl acrylamide, N,N-dimethyl acrylamide, N-cyclohexyl acrylamide, and the like. Expressly excluded are monomers wherein any of R1, R2, and R3 include functional moieties capable of chemical reaction such as —OH, —$CH_2OH$, halogen, and —CHO, for example.

The polymer of the inkjet ink binder may also include a copolymerized ethylenically unsaturated third monomer other than the monomers recited above such as, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; amino-functional and ureido-functional monomers; monomers bearing acetoacetate-functional groups; styrene and substituted styrenes; butadiene; fluoro (meth)acrylates; ethylene, propylene, α-olefins such as 1-decene; vinyl acetate, vinyl butyrate and other vinyl esters; and vinyl monomers such as vinyl chloride, vinylidene chloride. Preferred is from 10 to 98 wt % C1-C3 alkyl acrylate, based on polymer weight. More preferred is from 50 to 97% ethyl acrylate, based on polymer weight.

The aqueous emulsion polymer may contain from 0 to 5%, by weight based on the dry weight of the copolymer, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is the use of no copolymerized multi-ethylenically unsaturated monomers.

The glass transition temperature ("Tg") of the emulsion copolymer is typically from −40° C. to 120° C., or from −20° C. to 80° C. or even from −20° C. to 40° C. Tgs used herein are those determined by differential scanning calorimetry ("DSC").

The inkjet ink binders are typically prepared by emulsion polymerization. The polymerization techniques used to prepare aqueous emulsion polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used, in any known reaction process. Preferred is a reaction temperature between 10° C. and 95° C., more preferably between 20° C. and 90° C. The monomer mixture may be added neat or as an emulsion in water. The monomer mixture may be added in one or more additions or continuously, linearly or not, or combinations thereof, over the reaction period that is typically from 60 to 140 minutes.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

In one embodiment of the present invention the aqueous emulsion polymer may be prepared by a multistage emulsion polymerization process, in which at least two stages differing in composition are polymerized in sequential fashion. The polymerization techniques used to prepare such multistage emulsion polymers are well known in the art such as, for example, U.S. Pat. Nos. 4,325,856; 4,654,397; and 4,814,373.

The number average particle diameter of the polymer particles is typically from 150 to 400 nm, preferably from 250 to 300 nm, as measured by Capillary Hydrodynamic Fractionation ("CHDF"). The particle size distribution may be unimodal, bimodal, or polymodal; a unimodal distribution is preferred.

The inkjet ink of the present invention includes the inkjet ink binder; a liquid medium, preferably predominantly water and more preferably deionized water; and a colorant, such as a dye, pigment, or combinations thereof, preferably an organic or inorganic pigment. Typically the binder is present at a level of from 0.1 to 10 wt %, preferably from 2 to 3 wt %, based on the total weight of the ink. The aqueous carrier may be water; preferably, deionized water. Typically the aqueous carrier is present at from 40 to 95 wt %, preferably from 55 to 80 wt %, and more preferably, from 70 to 80 wt % based on the total weight of the ink.

The inkjet ink typically includes a pigment. As a result of the physical properties of pigments, pigment based ink compositions have a tendency to dry smear, have low resistance to wet-rub and have low highlighter resistance. The term "dry smear," as used herein, means applying abrasive pressure across the printed substrate and measuring any smear created thereby. The term "highlighter resistance," as used herein, means applying abrasive pressure across the printed substrate with a commercially available highlighting marker and measuring any smear created thereby; an example of such marker is Sanford Corp. MAJOR ACCENT brand highlighting markers.

Suitable pigments include, for example, organic pigments such as azo compounds, phthalocyanine pigments, quinacridone pigments, anthraquinone pigments, dioxazine pigments, indigo, carbon black, thioindigo pigments, perynone pigments, perylene pigments, and isoindolene; and inorganic pigments such as titanium dioxide, iron oxide, and metal powders. Typically the amount of colorant used is less than 10 wt %, preferably from 0.5 to 7 wt %, and more preferably from 3 to 6%, based on the total weight of the ink. Preferably, the pigment particle size is from 0.05 to 5 microns, more preferably not more than one micron and most preferably not more than 0.3 microns.

The inkjet ink may include a pigment dispersant. Suitable polymeric dispersants are known in the art, for example, in U.S. Pat. No. 5,821,283, U.S. Pat. No. 5,221,334, U.S. Pat. No. 5,712,338, and U.S. Pat. No. 5,714,538. Alternatively, pigment known as a self-dispersed pigment may be used or mixtures of a self-dispersed pigment and a pigment with dispersant. Pigments known as self-dispersed pigments or self-dispersing have been created with a surface modification. Such pigments can be surface modified in a variety of ways including, but not limited to, treatment with alkali salts of hypochlorite, ozone, and diazonium salts of aromatic sulfonic acid additions. These surface modified pigments have the distinct advantage of being self-dispersed in aqueous media and can be used without a corresponding polymeric dispersing agent. The surface modification can be performed on both black and color pigments.

For the purposes of this invention, the polymeric dispersant composition is not critical as long as its use results in a stable and printable ink. Polymeric dispersants are typically used at 0.1 to 5 wt %, based on the total weight of the ink. Pigment dispersions may be made by mixing pigment, dispersant, water, and optional additives and milling in, for example, a horizontal media mill, a vertical media mill, and an attritor mill.

The inkjet ink may also include, for example, humectants, dispersants, penetrants, chelating agents, buffers, biocides, fungicides, bactericides, surfactants, anti-curling agents, anti-bleed agents and surface tension modifiers. Useful humectants include ethylene glycol, 1,3 propanediol, 1,4 butanediol, 1,4 cyclohexanedimethanol, 1,5 pentanediol, 1,2-hexanediol, 1,6 hexanediol, 1,8 octanediol, 1,2 propanediol, 1,2 butanediol, 1,3 butanediol, 2,3 butanediol, diethylene glycol, triethylene glycol, tetraethylene glycol, polyethylene glycol with average molecular weight of 200, 300, 400, 600, 900, 1000, 1500 and 2000, dipropylene glycol, polypropylene glycol with average molecular weight of 425, 725, 1000, and 2000, 2-pyrrolidone, 1-methyl-2-pyrrolidone, 1-methyl-2-piperidone, N-ethylacetamide, N-methylpropionamide, N-acetyl ethanolamine, N-methylacetamide, formamide, 3-amino-1,2-propanediol, 2,2-thiodiethanol, 3,3-thiodipropanol, tetramethylene sulfone, butadiene sulfone, ethylene carbonate, butyrolacetone, tetrahydrofurfuryl alcohol, glycerol, 1,2,4-butenetriol, trimethylpropane, sorbital, pantothenol, Liponic EG-1. Preferred humectants are polyethylene glycol with average molecular weight of 400 to 1000, 2-pyrrolidone 2,2 thiodiethanol, and 1,5 pentanediol. The amount of humectant used may range from 1 to 30 wt %, preferably from 5 to 15 wt %, based on the total weight of the ink. Preferred penetrants are 1,2 $C_1$-$C_6$ alkyl diols, such as 1,2 hexanediol; N-propanol; isopropanol; and hexyl carbitol. The amount of penetrant used may range from 0.1 to 10 wt %, based on the total weight of the ink.

The inkjet ink may be prepared by any method known in the art such as, for example, by mixing, stirring or agitating the ingredients together.

The inkjet ink may be applied to a substrate such as paper, vinyl, and the like using thermal or piezoelectric inkjet ink printers such as, for example, Lexmark 7000, Lexmark 5700, Lexmark Z32, Lexmark Z51, Lexmark Z-65, Lexmark 2050 printers, Epson Stylus™ 3000, C-82, C-84, Hewlett-Packard DeskJet™ 550, 570, 694C, 698, 894, 895Ci, and Canon 750. The ink may be allowed to dry at ambient temperature or heated to dry at a higher temperature.

The following examples are illustrative of the invention.

Experimental Methods:

The resistance of inks to highlighter smearing is measured by assessing the optical density of the trailing edge of a highlighter mark after passing over the printed substrate into an unprinted area of the substrate. Printing reliability is measured by the number of clogged print head nozzles after printing 90 pages on a Lexmark desktop printer; values presented are the mean of six trials. The highlighter resistance test is used for all smear resistance testing.

The number average particle diameter reported herein is that determined by CHDF using a Matec model-2000 CHDF measurement system with a C-202 cartridge and GR-500 (2×) eluant (diluted 1/20). The CHDF instrument is calibrated with nominal 50, 100, 200, 300, 400, 500, 600, and 700 nm polystyrene column standards ("Nanosphere™" standards from Duke Scientific Corp., Palo Alto, Calif., USA) using the "new sigmoid fit" procedure (Matec CHDF-2000 software, version 3.20). Particle sizes are calculated using the deconvolution calculation for maximum resolution.

Glass transition temperatures are measured by Differential Scanning Calorimetry with a model Q-1000 DSC instrument (TA Instruments, New Castle, Del., USA) at a temperature ramp rate of 20° C./minute (after pre heating the sample to 150° C. for 5 min) on a 16 mg sample in a nitrogen atmosphere, using "Universal Analysis" software (version 4.0.0) to calculate the midpoint of the transition.

All ranges disclosed herein are inclusive and the minimums and maximums of the nested ranges are combinable.

Abbreviations used herein:
Wt %=weight percent
SLS=sodium lauryl sulfate
NaPS=sodium persulfate
APS=ammonium persulfate
KDDBS=potassium n-dodecyl benzenesulfonate
EA=ethyl acrylate
MMA=methyl methacrylate
MAA=methacrylic acid
AA=acrylic acid
AN=acrylonitrile
BA=butyl acrylate
EHA=2-ethylhexyl acrylate
AAm=acrylamide
DI water=deionized water

EXAMPLE 1

Preparation of Inkjet Ink Binder and Inkjet Ink

To a reaction vessel containing 525 ml DI at 18° C., 20% of a mixture of 487 g water, 2.0 g SLS (28%), 72.2 g Triton™ X-165 surfactant (70%), 82.9 g AAm; (53% aq.), 115 g AN, and 985 g EA is added along with 2.8 g 0.15% ferrous sulfate, 0.48 g APS, and 0.42 g Lykopon™ along with 36 g water. After the vessel is inerted and stirring applied, the reaction displays an exotherm. After the exotherm, the rest of the monomer mixture is added gradually after adding an additional 1.26 g of SLS, 26.7 g of Triton™ X-165, and 44 g water to the remaining monomer emulsion. The polymerization maintains a temperature of 62-64° C. during the monomer addition. A co-feed of 1.6 g APS in 45 g water and 2.2 g sodium bisulfite in 45 g water is also gradually added. Rinses of water (6 g total) are added, and the reaction is gradually cooled to 30° C., diluted with an additional 147 g water, and filtered. An 800 g portion of the filtered product is neutralized with 1% KOH (pH=8.7), diluted to 25% solids with additional water, and filtered through a 1 micron filter to give the final sample. The number average particle size is 206 nm (CHDF) and Tg is +2.6° C. (DSC).

An ink jet ink composition is then prepared with the binder from Example 1 by mixing the ingredients as follows:

| Ingredient | Weight Percent (%) |
|---|---|
| Self-Dispersing Carbon Black | 2 |
| Dispersed Carbon Black | 2 |
| Example 1 binder | 3 |
| Polyethylene Glycol 400 | 7.5 |
| 2-Pyrrolidinone | 7.5 |
| 1,2-Hexanediol | 1.2 |
| Hexylcarbitol | 0.4 |
| Water | Balance |
| TOTAL | 100.0 |

The ink is used to print on a Lexmark desktop printer. On the 90$^{th}$ page of this print test that is repeated 6 times, an average of 152 (out of 208 nozzles) nozzles in the ink cartridge continues to fire. Performance in terms of wet-rub smear or resistance to smearing by highlighter pens is excellent, with little-to-no smearing evident. The average particle size of the resin is 281 nm by laser light scattering method; the Tg is +2.6° C.

COMPARATIVE EXAMPLE A

Preparation of Comparative Inkjet Ink Binder and Inkjet Ink

A monomer mixture is polymerized according to EXAMPLE 1 except that 20% of a mixture of 487 g water, 2.0 g SLS (28%), 72.2 g Triton X-165™ (70%), 98 g methylol acrylamide-45 (45% solids, Cytec Industries), 115 g AN, and 985 g EA is used in the polymerization. After the reaction mixture is gradually cooled to 30° C., it is diluted with an additional 145 g water and filtered. An 800 g portion of the filtered product is neutralized with 1% KOH (pH=8.7), diluted to 25% solids with water, and filtered through a 1 micron filter to give the final sample. The number average particle size is 226 nm (CHDF), Tg is −1.5° C. (DSC) and by-product free formaldehyde is 139 ppm per gram of emulsion polymer.

The ink formulation is identical to that of Formulation 1 using the binder of Comparative Example A. The ink is used to print 90 pages on a Lexmark desktop printer. On the 90th page of this print test that is repeated 6 times, an average of 191 (out of 208 nozzles) nozzles in the ink cartridge continues to fire. Performance in terms of resistance to smearing by highlighter pens is similar to that of Example 1.

COMPARATIVE EXAMPLE B

Preparation of Comparative Inkjet Ink Binder and Inkjet Ink

To a reaction vessel containing 533 ml DI water 2.8 g 0.15% ferrous sulfate, 0.48 g APS, 0.42 g Lykopon™, and 101 g of an acrylic polymer dispersion (average particle size=99 nm, 45% solids) to 18° C. and inserting the vessel with nitrogen, 34% of a mixture of 487 g water, 7.1 g of SLS (28%), 115 g AN, and 1030 g EA is slowly added with stirring along with 36 g water. After a period of time, the reaction displays an exotherm. After the exotherm, the rest of the monomer mixture is gradually added, along with 36 g water. A co-feed of 1.6 g APS in 45 g water and 2.2 g sodium bisulfite in 45 g water is also added over the monomer feed period. The polymerization is maintained at a temperature of 62-64° C. during the monomer addition. Additional rinses of water (6 g total) are added, and the reaction is gradually cooled to 30° C., diluted with 125 g water, and filtered. An 800 g portion of the filtered product is neutralized with 1% KOH (pH=7.3), diluted to a 25% solids level with additional water, and filtered through a 1 micron filter to give the final sample. The number average particle size is 280 nm (CHDF), and Tg is +3.0° C. (DSC).

An ink (Formulation 1 with the binder of Comparative Example B) is used to print on a Lexmark desktop printer. On the 10th page of this print test that is repeated 6 times, an average of 0 (out of 208 nozzles) nozzles in the ink cartridge continues to fire. Performance in terms of resistance to smearing by highlighter pens is similar to that of Example 1.

EXAMPLE 2

Preparation of Inkjet Ink Binder and Inkjet Ink

A monomer mixture is polymerized according to Comparative Example B except that 33% of a mixture of 487 g water, 7.1 g of SLS (28%), 82.8 g AAm (53% aq.), 240 g MMA and 859 g BA is gradually added to a reaction vessel containing 531 ml deionized water along with 36 g water. The reaction mixture is gradually cooled to 30° C., diluted with an additional 89 g water, and filtered. An 800 g portion of the filtered product is neutralized with 1% KOH (pH=7.1), diluted to 25% solids with additional water, and filtered through a 1 micron filter to give the final sample. The number average particle size is 260 nm (CHDF), and Tg is −23° C. (DSC).

An ink (Formulation 1 with the binder of Example 2) is used to print on a Lexmark desktop printer. On the 90th page of this print test that is repeated 6 times, an average of 107 (out of 208 nozzles) nozzles in the ink cartridge continues to fire. Performance in terms of resistance to smearing by highlighter pens is inferior to that of Example 1.

EXAMPLE 3

Preparation of Inkjet Ink Binder and Inkjet Ink

A monomer mixture is polymerized according to Comparative Example B except that 34% of a mixture of 487 g water, 7.1 g of SLS (28%), 82.9 g AAm (53% aq.), and 1100 g EA is gradually added to a reaction vessel containing 526 ml DI water along with 36 g water. The reaction is gradually cooled to 30° C., diluted with an additional 93 g water, and filtered. An 800 g portion of the filtered product is neutralized with 1% KOH (pH=7.1), diluted to 25% solids with water, and filtered through a 1 micron filter to give the final sample. The number average particle size is 274 nm (CHDF), and Tg is −10.9° C. (DSC).

An ink (Formulation 1 with the binder of Example 3) is used to print on a Lexmark desktop printer. On the 90th page of this print test that is repeated 6 times, an average of 180 (out of 208 nozzles) nozzles in the ink cartridge continues to fire. Performance in terms of resistance to smearing by highlighter pens is equivalent to that of Example 1 with little-to-no smearing evident.

COMPARATIVE EXAMPLE C

Preparation of Comparative Inkjet Ink Binder and Inkjet Ink

A monomer mixture is polymerized according to Comparative Example B except that 34% of a mixture of 487 g water, 7.1 g of SLS (28%), and 1144 g EA is gradually added to a reaction vessel containing 533 ml DI water along with 36 g water. The reaction is gradually cooled to 30° C., diluted with 125 g water, and filtered. An 800 g portion of the filtered product is neutralized with 1% KOH (pH=7.0), diluted to a 25% solids level with water, and filtered through a 1 micron filter to give the final sample. The number average particle size is 277 nm (CHDF), and Tg is −14.1° C. (DSC).

An ink (Formulation 1 with the binder of Comparative Example C) is used to print on a Lexmark desktop printer. At or near the first page of this print test, all nozzles are clogged, giving an average of 0 (out of 208 nozzles) nozzles in the ink cartridge that continues to fire. Performance in terms of resistance to smearing by highlighter pens is equivalent to that of Example 1 with little-to-no smearing evident.

What is claimed is:
1. An ink comprising:
   an aqueous carrier;
   a pigment; and
   a polymeric binder consisting essentially of an aqueous dispersion of polymer particles, said polymer comprising, as polymerized units, (a) from 0 to 1 wt. % monoethylenically unsaturated acid monomer, based on polymer weight; (b) monomer of the formula $CH_2=C(R1)-CON(R2)(R3)$ wherein $R1=H$, $CH_3$ or $C_2H_5$ and R2 and R3 are independently selected from the group consisting of H, C1-C6 saturated alkyl and cycloalkyl groups; and (c) from 50 wt. % to 97% wt. % ethyl acrylate of the total weight of said binder; and wherein the total of (a) and (b) is at least 0.1 wt % monomer based on said polymer weight; and wherein the number average particle size of said binder is in the range of 150 nm to 400 nm as measured by Capillary Hydrodynamic Fractionation and wherein the glass transition temperature of said binder is in the range of −10° C. to 10° C.

2. The ink as in claim 1 in which said number average particle size of said binder is in the range of 250 nm to 300 nm.

3. The ink as in claim 1 in which said (b) monomer is selected from the group consisting of acrylamide, methacrylamide, ethacrylamide, N-methyl acrylamide, N-ethyl methacrylamide, N-t-butyl acrylamide, N,N-dimethyl acrylamide, N,N-diethyl acrylamide, N-cyclohexyl acrylamide, and combinations thereof.

4. The ink as in claim 1 in which said (b) monomer of said binder comprises acrylamide.

5. The ink as in claim 1 in which said (a) monomer of said binder is selected from the group consisting of methacrylic acid, acrylic acid and combinations thereof.

* * * * *